United States Patent [19]

Sterner

[11] 4,432,691
[45] Feb. 21, 1984

[54] PIPE MANIPULATOR

[75] Inventor: Russell L. Sterner, Greencastle, Pa.

[73] Assignee: Kiddie, Inc., Saddle Brook, N.J.

[21] Appl. No.: 312,081

[22] Filed: Oct. 16, 1981

[51] Int. Cl.³ .............................................. B66C 1/42
[52] U.S. Cl. ................................... 414/735; 414/736;
 414/740; 414/745; 294/81 R; 294/104
[58] Field of Search ............... 414/731, 428, 732, 735,
 414/736, 738–740, 745, 747, 911, 23, 783, 758,
 22; 294/81 R, 104, 105; 29/431

[56] References Cited

U.S. PATENT DOCUMENTS

| 3,112,830 | 12/1963 | Podlesak | 414/735 X |
| 3,219,215 | 11/1965 | Gunnlaugson | 414/739 X |
| 3,796,331 | 3/1974 | Dutton | 414/739 X |
| 3,989,150 | 11/1976 | Stephenson et al. | 414/740 |
| 4,217,076 | 8/1980 | Robnett et al. | 414/735 |
| 4,280,785 | 7/1981 | Albrecht | 414/735 |
| 4,303,270 | 12/1981 | Adair | 414/22 X |

FOREIGN PATENT DOCUMENTS 312818  10/1971  U.S.S.R. .................. 414/23

Primary Examiner—Joseph E. Valenza
Assistant Examiner—Terrance L. Siemens
Attorney, Agent, or Firm—Brady, O'Boyle & Gates

[57] ABSTRACT

A self-contained power-operated manipulator for piping and the like is capable of coordinated movements which approximate those of the human arm and hand. Spaced pairs of cooperative opposing fixed and movable jaws on a common carrier structure can rotate in two directions around the axis of a main support to which the carrier structure is pivoted on crossing relationship. The carrier structure, with the attached pairs of jaws, can be swung in two directions through large angles around the pivot axis of the carrier structure. The pairs of jaws on the carrier structure can be rotated in unison around the axis of the carrier structure and the movable jaws of the opposing pairs can be rotated relative to the fixed jaws around the axis of the carrier structure. Separate power units are utilized for producing the several movements of the manipulator in a coordinated manner. The pipe manipulator can be attached to a crane boom jib or other support.

20 Claims, 10 Drawing Figures

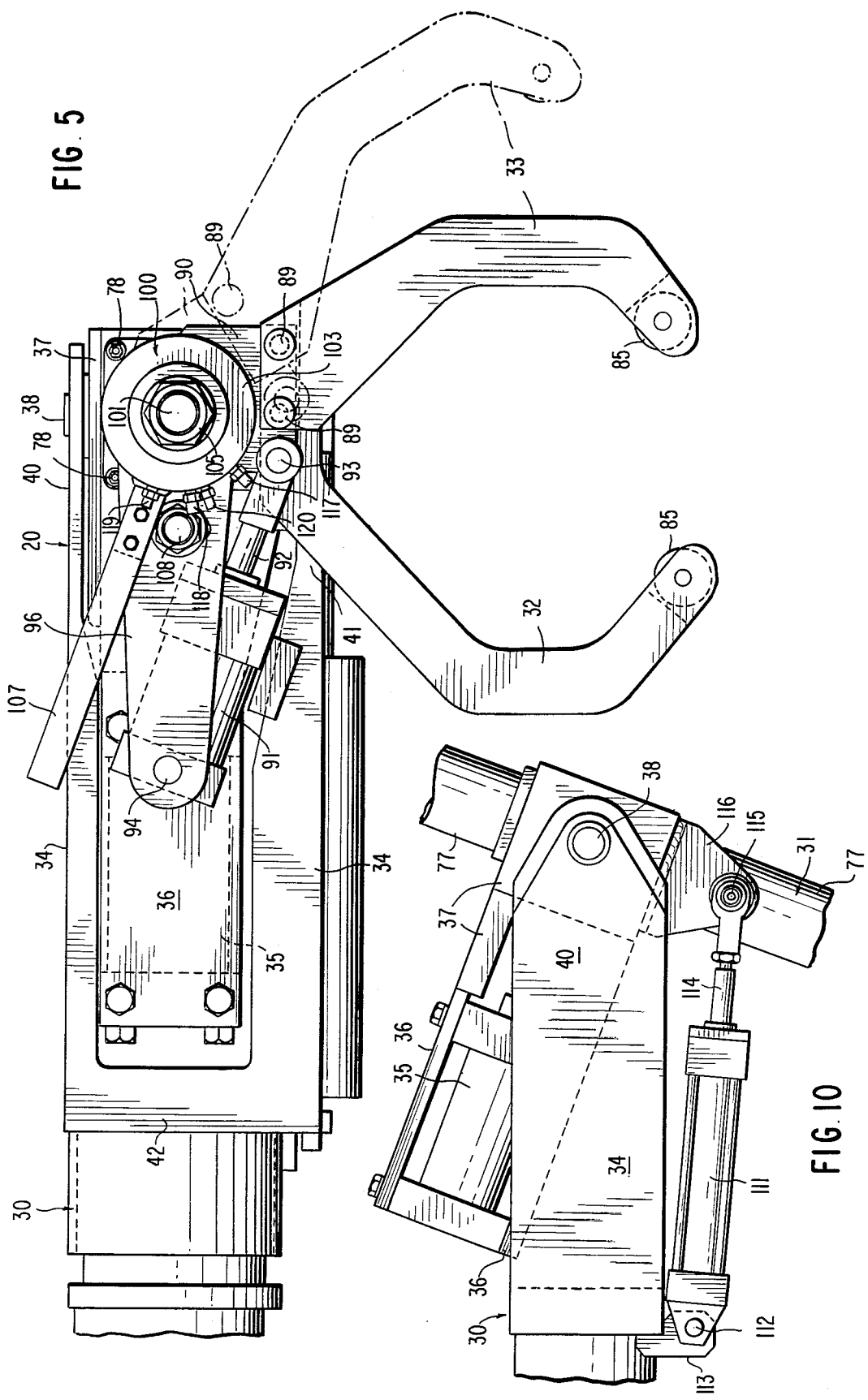

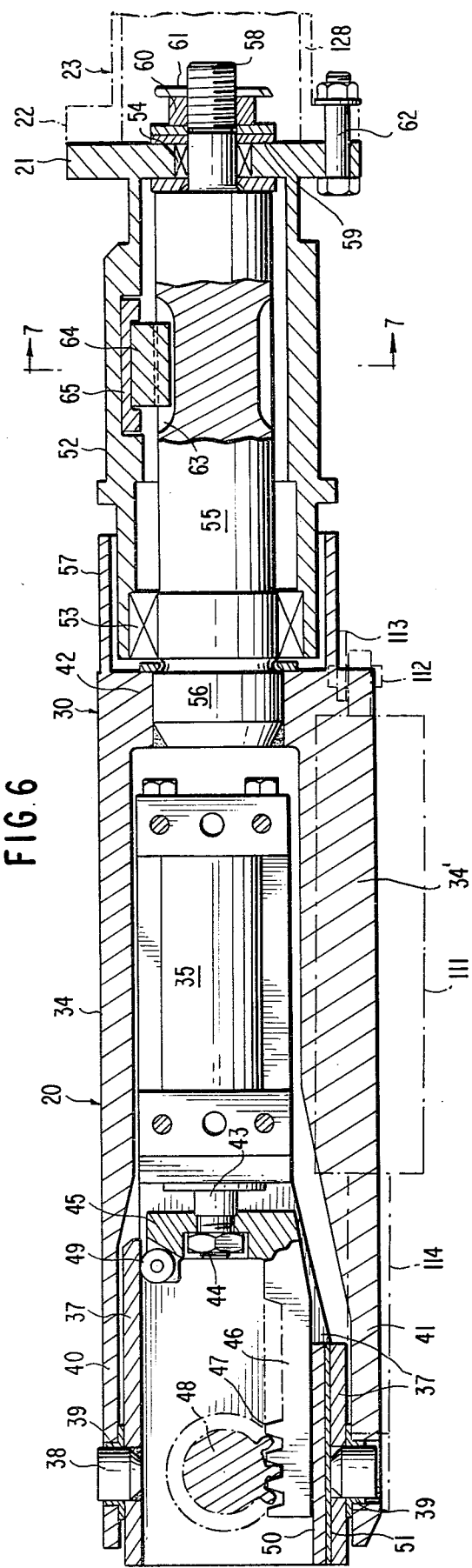
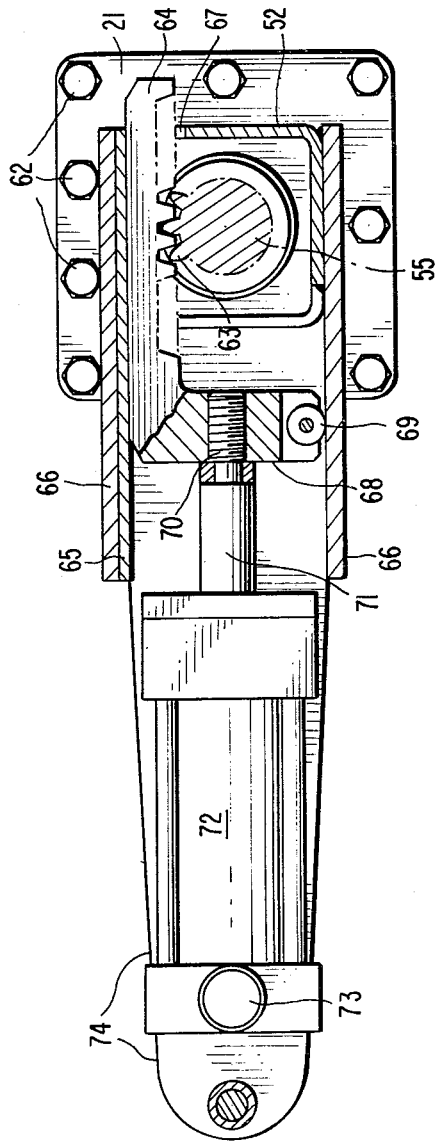

PIPE MANIPULATOR

BACKGROUND OF THE INVENTION

Various devices for handling pipes and the like are known in the prior art. U.S. Pat. No. 3,664,002 shows an example of the prior art in terms of an apparatus which can transport a pipe and maneuver it on several axis of movement to position the pipe in a required manner. The general objective of the present invention is to substantially improve on the prior art of this type through provision of a more compact and unified apparatus which is capable of even greater versatility in its coordinated movements so that pipes can be positioned with precision and stability at difficult locations, such as against a ceiling in a building structure while being held by the manipulator.

Another object of this invention is to provide a pipe manipulator in the form of a compact, self-contained unit including several separate but coordinated power devices for causing the diverse movements; the manipulator being particularly well adapted for mounting on an adjustable attachment jib of a construction crane boom, but not limited to this mounting or use.

Still another object is to provide a unitized pipe manipulator having built-in power components for achieving a wide range of diverse movements in the pipe gripping jaws of the device, the manipulator being characterized by great rigidity and strength because of its compactness which eliminates bending and deflection present in some of the prior art where operational components are widely spaced.

Another objective of the invention is to provide a pipe manipulator apparatus which is readily attachable through one adapter of coupling flange to a mating support flange of a crane boom or jib.

A further object of the invention is to provide a pipe manipulator whose several moving components are driven by precision mechanism powered by hydraulic power cylinders which are compatible with the hydraulic systems present on construction equipment, such as cranes.

Other features and advantages of the invention will become apparent during the course of the following description.

BRIEF DESCRIPTION OF THE DRAWINGS

FIG. 5 is an enlarged side elevation of the manipulator taken on line 5—5 of FIG. 4.

FIG. 6 is a vertical section taken on line 6—6 of FIG. 4.

FIG. 7 is a transverse vertical section taken on line 7—7 of FIG. 6.

FIG. 10 is a fragmentary plan view of the manipulator with a pivoted jaw carrier thereof and associated elements partly rotated.

DETAILED DESCRIPTION

Figure 2:
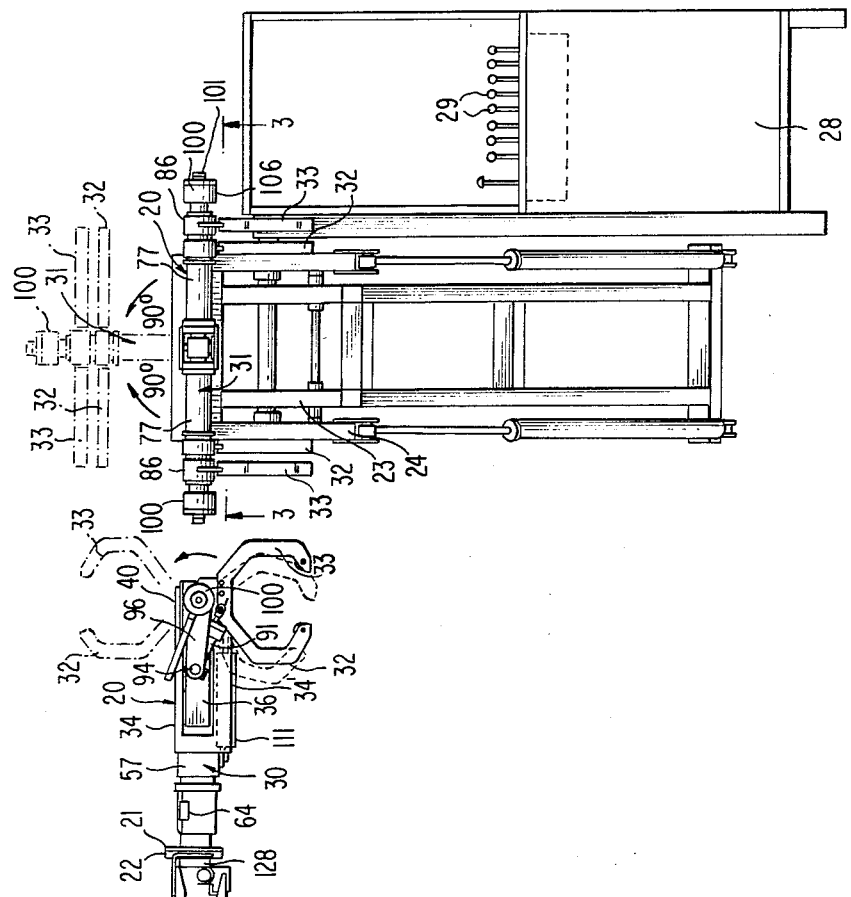
FIG. 2 is an end elevational view of the components shown in FIG. 1.
Figure 1:
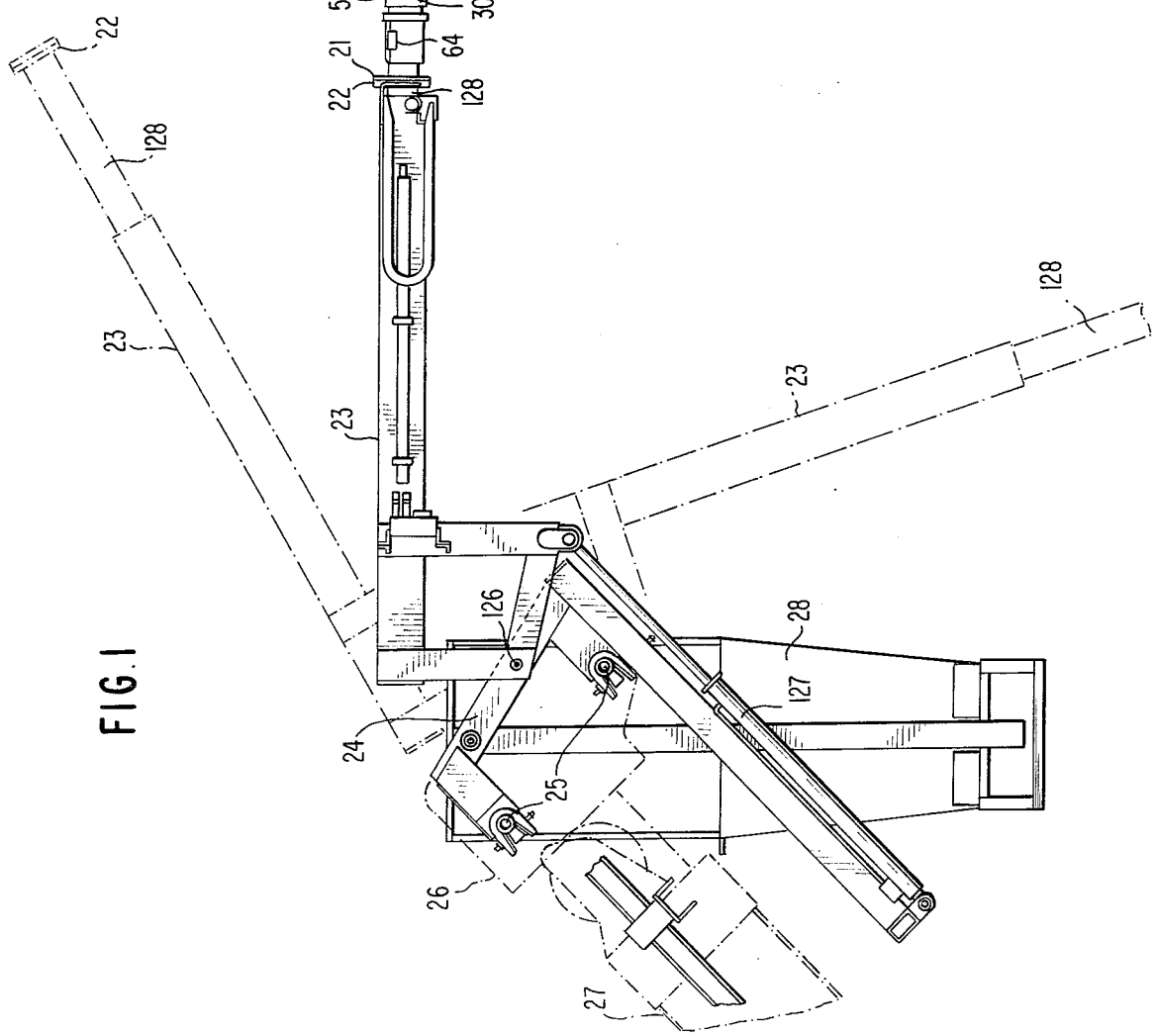
FIG. 1 is a side elevation of a pipe manipulator according to the present invention installed on a movable jib carried by the boom of a crane.

Referring to the drawings in detail wherein like numerals designate like parts and making reference first to FIGS. 1 and 2 which show a pipe manipulator assembly 20 in its entirety mounted through an adapter flange 21 with a mating flange 22 of a movable jib 23 pivotally carried by a support base 24 detachably coupled at 25 with the nose assembly 26 of a construction crane boom 27. While this particular mounting of the manipulator 20 is efficient and contributes greatly to its versatility of use, it should be understood that the invention is not limited to use a crane boom or boom jib and the manipulator could be supported in other ways on other types of machines or bases. It should be mentioned that the support base 24 for the jib 23 may include a pendulum-type basket 28 for an operator, and this basket may be equipped with controls 29 for the manipulator 20 and/or the crane boom 27 and jib 23.

Figure 3:
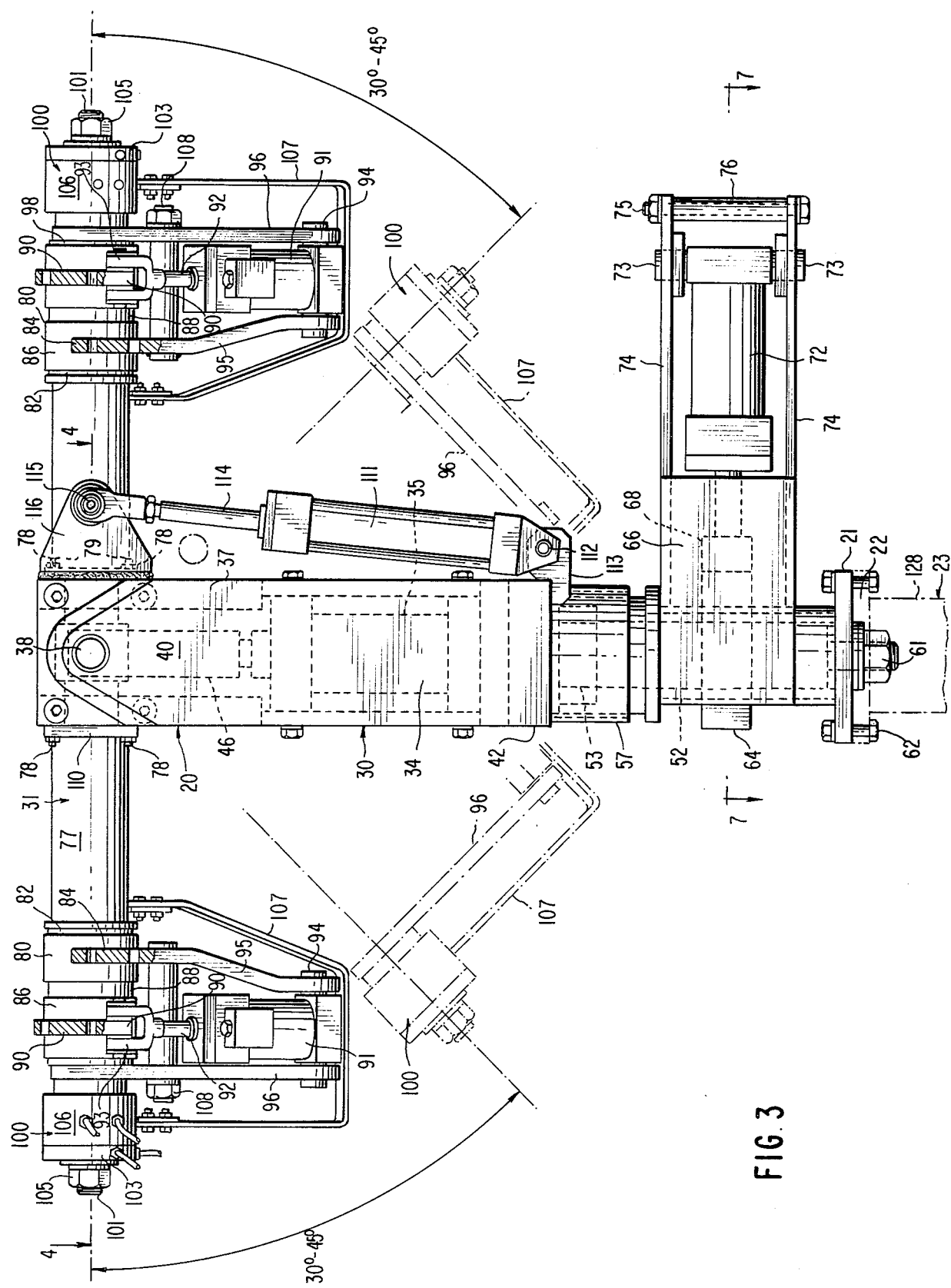
FIG. 3 is an enlarged bottom plan view, partly in section, taken on line 3—3 of FIG. 2.
Figure 9:
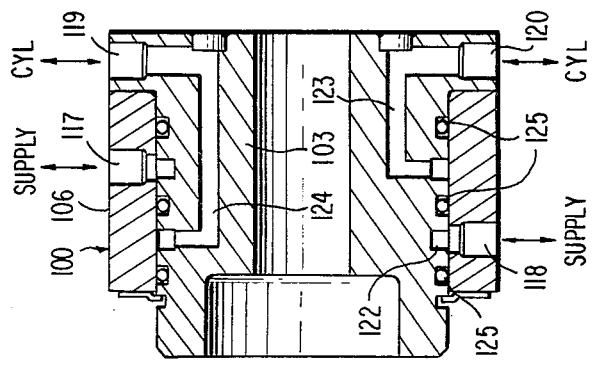
FIG. 9 is a vertical section taken on line 9—9 of FIG. 8.

Referring now to the remaining drawing FIGS. 3 through 10 showing details of the pipe manipulator 20, the same comprises a main body or support portion 30 carrying the adapter flange 21 and being coaxial with the jib 23 and projecting forwardly of the jib. At its forward end, the longitudinal body portion 30 of the manipulator carries a pivoted cross support 31 for two pairs of opposing cooperating pipe gripping jaws 32 and 33 near the opposite ends of the cross support 31. Thus, the overall configuration of the manipulator 20 with the cross support 31 in the neutral position, FIG. 3, is T-shaped. However, as presently will be described, the cross support 31 with the jaws carried thereby can be rotated in two directions on the pivot axis of the cross support, and the latter can also be rotated with the jaws around the axis of the body portion 30 and the jaws can rotate around the axis of the cross support 31. Additionally, the movable jaws 33 of each pair, namely, the front jaws of the manipulator as viewed in FIGS. 1 and 5, may be moved in unison relative to the fixed jaws 32 around the axis of cross support 31.

More particularly, the main longitudinal body portion 30 of the pipe manipulator comprises a housing formed of two superposed plates 34 and 34' between which is disposed a hydraulically powered cylinder 35 rigidly held between two parallel mounting plates 36, FIG. 10. The two plates 36 include forward extensions 37, FIGS. 4 and 6, which are in spaced parallel relationship and have welded to them a pair of coaxial trunnions 38, the rotational axis of which is perpendicular to the axis of cylinder 35. The trunnions 38 are journaled in bearings 39 held in openings of reduced thickness forward plate extensions 40 and 41 of the divided cylinder housing composed of the two plates 34 and 34'. These two plates are interconnected at their read ends only by a wall 42. The space between the two plates 34 and 34' permits swinging of the cylinder 35 at certain times beyond the confines of the two plates on the axis of trunnions 38 as depicted in FIG. 10.

It can be seen that cylinder 35 and associated parts is pivotally cantilevered through trunnions 38 and plate extensions 37 from the extensions 40 and 41 of the two cylinder housing plates. Piston rod 43 of cylinder 35 is rigidly coupled at 44 to an upright arm 45 of a rack bar 46 whose teeth are in mesh with gear teeth 47 on a rotational shaft 48 of cross support 31. The rack bar 46 is stabilized by a guide roller 49 on the arm 45 which engages the lower face of upper extension plate 37. The bottom face of the rack bar slidably engages a bearing plate 50 which may be shimmed as required at 51.

Body portion 30 rearwardly of housing wall 42 comprises a relatively stationary rack housing 52 to which the adapter flange 21 is attached. Coaxial bearings 53 and 54 within the housing 52 rotatably support a shaft 55 whose forward nose 56 is welded in an opening provided in the wall 42. The bearing 53 is protected by a skirt 57 on the wall 42 which surrounds the forward end portion of relatively stationary housing 52. A rear end threaded extension 58 on rotary shaft 55 within the bearing 54 carries washers 59, a nut 60 and a cotter pin 61. Bolt means 62 is utilized to connect the jib flange 22 rigidly with the adapter flange 21 of the manipulator assembly 20.

Within housing 52, shaft 55 has gear teeth 63 in mesh with the teeth of a transverse rack bar 64 whose top face slidably engages a plate bearing 65 held in a transverse extension 66 of the housing 52, which housing, FIG. 7, has an opening 67 in one side wall thereof through which the rack bar 64 can project. A depending leg 68 on the rack bar 64 carries a guide roller 69 which engages the bottom wall of housing extension 66.

The leg 68 of rack bar 64 is coupled as at 70 with a piston rod 71 of a hydraulic cylinder 72 disposed across the axis of cylinder 35 and shaft 55. The cylinder 72 includes removable trunnions 73 engaged with elongated support arms 74 through which the cylinder is cantilevered from the extension 66 of housing 52. The outer ends of arms 74 are connected by a bolt 75, surrounded by an arm spacer sleeve 76. It can now be seen that rotation imparted to shaft 55 by rack bar 64 produces corresponding rotation to the housing of cylinder 35 including the trunnions 38, the cylinder 35 itself, and all associated elements.

The aforementioned cross support 31 of the manipulator which can rotate as a unit with the driven shaft 55 and parts secured thereto comprises two coaxial housing sleeves 77 whose interior end flanges are secured by nuts 78 to threaded studs 79 carried by plate extensions 37. The housing sleeves 77 surround and enclose portions of the shaft 48. Outwardly of the two housing sleeves 77, hubs 80 are splined at 81 to the shaft 48 to rotate therewith. These hubs and the other end flanges of housing sleeves 77 which do not rotate are intervened by suitable bearing washers 82. Relatively stationary pipe gripping jaws 32 are removably coupled by pins 83 to apertured lugs 84 rigid with the hubs 80. It is contemplated in the invention to provide the stationary and movable pipe gripping jaws in several different sizes which are readily interchangeable so that a variety of pipe sizes can be handled. The jaws at their lower extremities have pipe seating rollers 85, as shown.

Axially outwardly of the hubs 80, additional hubs 86 are mounted on smooth portions 87 of the shaft 48 with spacer rings 88 disposed between the adjacent pairs of hubs 80 and 86. The relatively movable pipe gripping jaws 33 are detachably mounted through pins 89 with apertured lugs 90 rigidly secured to the hubs 86.

Figure 4:
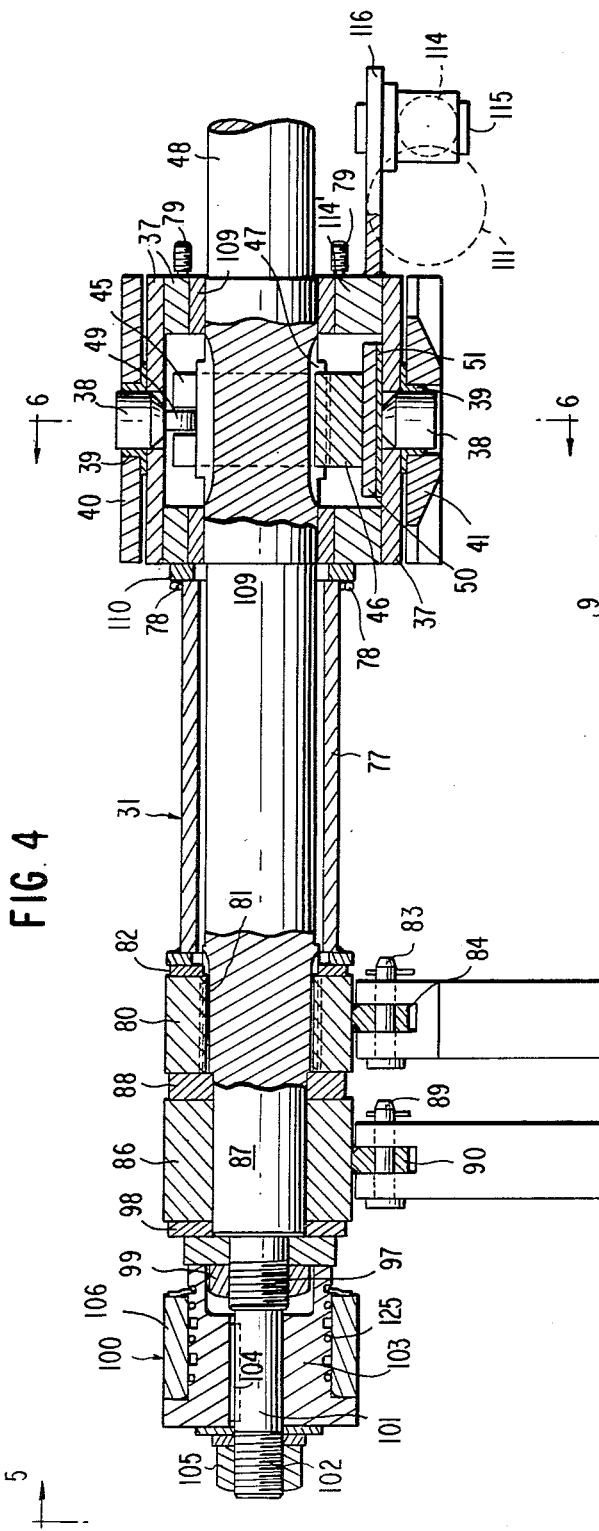
FIG. 4 is an enlarged fragmentary section taken on line 4—4 of FIG. 3.
Figure 8:
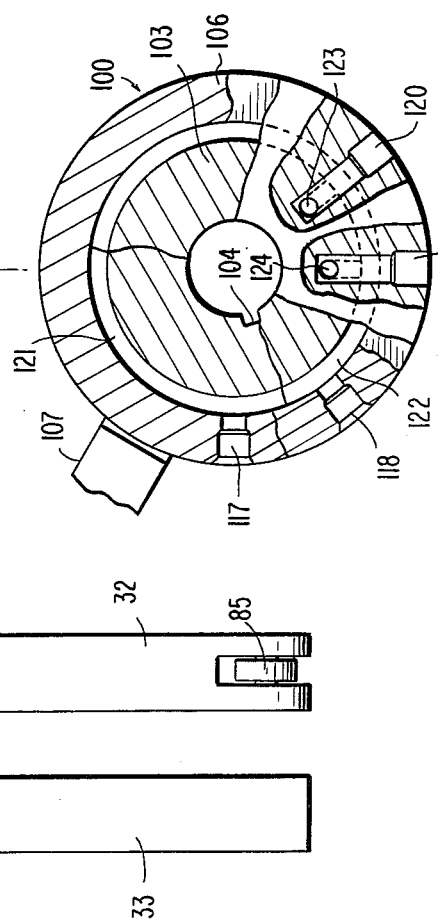
FIG. 8 is an enlarged vertical section through a swiveled fluid coupling, parts broken away to show different levels within the coupling.

Hydraulic cylinders 91 to operate the movable jaws 33 have their rods 92 coupled at 93 to the lugs 90 which carry the movable jaws 33. The rear ends of cylinders 91 are connected at 94 between pairs of side plates 95 and 96. The interior side plates 95 are integrally attached to the hubs 80 and their apertured lugs 84 carrying fixed jaws 32. The exterior side plates 96, FIG. 4, are engaged with a reduced threaded extension 97 near each end of the shaft 48, and clamped against a shoulder on the end of smooth portion 87 by a nut 99 on each threaded extension 97. A washer 98 is disposed between each side plate 96 and hub 86. By this means, the hubs 86 of movable jaws 33 are secured to the shaft 48 to turn therewise when all of the jaws, fixed and movable, are rotated with the shaft 48 by means of the rack bar 46 and cylinder 35.

Further outwardly on the rotary shaft 48 hydraulic fluid couplings 100 are carried by the shaft 48. More particularly, the shaft 48 has further reduced end extensions 101 which are threaded at 102. Interior flanged components 103 of the couplings 100 are keyed to shaft extensions 101 at 104 and thus turn with shaft 48. Nuts 105 on extensions 101 retain the fluid couplings 100 against the arms 96, as shown in FIG. 4. The fluid couplings 100 further comprise exterior non-rotatable ring components 106 which are held against rotation with the shaft 48 and components 103 by bridging brackets 107 rigidly connected between the stationary housing sleeves 77 and the ring components 106. Thus, when the shaft 48 is rotated by rack bar 46 to move the fixed and movable jaws 32 and 33 simultaneously through a full 195 degrees of movement as shown in full lines and broken lines in FIG. 1, the elements 80, 86 and 103 are driven in rotation with the jaws 32 and 33, their associated cylinders 91 and cylinder support arms 95 and 96 while the elements 77, 106 and 107 remain stationary. It should be noted that the arms 95 and 96 are further interconnected as at 108 to resist their spreading apart. It should also be mentioned that bearings 109 for the shaft 48, FIG. 4, are retained in place by the inner end flanges 110 of housing sleeves 77.

A swing cylinder 111 for the entire cross support 31 which pivots on trunnions 38 relative to longitudinal body portion 30 has its rear end attached at 112 to a lug 113 fixed on housing plate 34'. The rod 114 of cylinder 111 is similarly coupled at 115 to a bracket plate 116 welded to the adjacent element 114' of plate extension 37. It should be noted that cylinder 111 as well as cylinders 35, 72 and 91 are double-acting hydraulic cylinders. The swing cylinder 111 is able to swing the cross support 31 on the axis of trunnions 38 through a total arc of about 66 degrees or one-half of this angle on either side of the body portion 30, FIG. 3. The cylinder 72 is able to rotate the shaft 55, the housing composed of plates 34 and 34' and the entire cross support 31 around the axis of body portion 30 a full 180 degrees, or 90 degrees in either direction. In FIG. 2, the jaws 32 and 33 shown in full lines when the cross support 31 is level are also shown in phantom lines where the cross support is rotated 90 degrees clockwise or counterclockwise as shown by the directional arrows. In other words, two conditions of rotation of the cross support 31 around the axis of shaft 55 and body portion 30 are shown in FIG. 2.

The rotational fluid couplings 100 which are necessary to deliver hydraulic fluid to the two cylinders 91 for moving the jaws 33 relative to the jaws 32 function as follows. Fluid is supplied through lines, not shown, to ports 117 and 118 of stationary component 106 and is delivered to and from cylinders 91 by means of ports 119 and 120 in movable component 103. Ports 117 and 118 communicate with annular grooves 121 and 122 in component 103 which, in turn, communicate with axial passages 123 and 124 leading to ports 120 and 119, respectively, FIG. 9. Appropriate ring seals 125 are provided in the rotational coupling to prevent cross-communication of ports. Thus, in all adjusted positions of the movable jaws 33 which are the forwardmost jaws in FIG. 1, fluid can be properly delivered to and taken from cylinders 91. When the shaft 48 rotates the fixed and movable jaws in unison about the axis of cross support 31 by the operation of cylinder 35 and rack bar 46, there is no relative rotation between the components 103 and 106 and the entire couplings 100 turn with the shaft 48 and jaws 32 and 33 as a unit.

It should now be clear in light of the foregoing description that a very compact, self-contained manipulator for pipe is provided through the invention which is capable of a number of coordinated independent movements which collectively closely simulate those of the human arm and hand. Independent power means are provided on the manipulator in the form of the several hydraulic cylinders to produce the diverse movements of the pipe gripping jaws 32 and 33 are required in particular situations.

The cylinder 72 and associated rack bar 64 through shaft 55 and elements 40 and 41 can rotate the entire cross support 31 through 180 degrees of movement as explained in connection with FIG. 2. Separately or simultaneously, the swing cylinder 111 can swing the cross support 31 on the axis of trunnions 38 through approximately 66 degrees as shown in FIGS. 3 and 10. Separately or simultaneously, the cylinder 35 of longitudinal body portion 30 can rotate the cross shaft 48 which in turn can rotate all of the jaws 32 and 33 in unison through 195 degrees, as shown in FIG. 1. Additionally, separately or simultaneously with the other described movements of the manipulator, the two cylinders 91 acting in unison through the rotational fluid couplings 100 can move the jaws 33 relative to the jaws 32 somewhat like the fingers of the hand. The entire manipulator is basically T-shaped, FIG. 3, very sturdy and entirely practical in its construction.

It will also be recognized that the entire manipulator 20 can be bodily positioned at the necessary location by luffing the jib 23 about its pivot 126 with jib luffing cylinders 127, and extending or retracting the telescoping section 128 of the jib 23 with a telescoping cylinder, not shown, connected between the jib sections and interior thereof, if indeed the manipulator is used on such a jib, as illustrated in the drawings. As suggested previously, the manipulator could be mounted in other ways.

When mounted on the telescoping boom 27 of a construction crane, course positioning of the manipulator is provided by the turntable rotation, and boom extension, retraction and luffing functions of the crane. These functions may also be controlled with the controls 29 in the operator's station or basket 28. More refined positioning movements are then imparted to the manipulator through the controls 29 by the extension, retraction and luffing movements of the jib 23. Precise positioning movements for an object such as a pipe or tube gripped by the jaws 32 and 33 are then provided by the extension and retraction of the piston-cylinder units 35, 72 and 111 on the manipulator.

The terms and expressions which have been employed herein are used as terms of description and not of limitation, and there is no intension, in the use of such terms and expressions, of excluding any equivalents of the features shown and described or portions thereof but it is recognized that various modifications are possible within the scope of the invention claimed.

I claim:

1. A manipulator for pipes and the like comprising a longitudinal body portion adapted for attachment to a support, a cross support pivotally mounted on the body portion and adapted to swing in two directions relative thereto, pairs of cooperative pipe gripping jaws on the cross support and being bodily swingable therewith on the pivot axis of the cross support and also being rotationally connected to the cross support whereby the pairs of jaws can move rotationally in unison around the axis of the cross support, one jaw of each cooperative pair being fixed relative to the other jaw of each pair and the other jaw of each pair being movable relative to the fixed jaw around the axis of the cross support, said longitudinal body portion including a rotational assembly bodily carrying the cross support and pivot means for the cross support defining said pivot axis, a first power means on said body portion operable to rotate said rotational assembly in two directions, a second power means connected between the body portion and cross support and operable to swing the latter in two directions on its pivot axis, a third power means connected between the body portion and said cross support and pairs of jaws and operable to rotate the pairs of jaws in unison in two directions around the axis of the cross support, and a fourth power means on the cross support and being operatively connected with the movable jaws of the cooperative pairs to move the movable jaws in two directions relative to the other jaws of the pairs around the axis of the cross support.

2. A manipulator for pipes as defined in claim 1, and said first, second and third power means each comprising a single double-acting power cylinder, the fourth power means comprising a synchronized pair of double-acting power cylinders.

3. A manipulator for pipes as defined in claim 2, and a pair of rotational fluid couplings on the cross support operatively connected with the pair of cylinders of the fourth power means and including rotational components engaged with the third power means and non-rotatable components secured to the cross support.

4. A manipulator for pipes as defined in claim 3, and the third power means including a rotational shaft on the cross support rigidly coupled with the movable jaws of said pairs and with the rotational components of said fluid couplings.

5. A manipulator for pipes as defined in claim 3, and bridging brackets on the cross support connected between non-rotational housing parts of the cross support and said non-rotational components of said couplings.

6. A manipulator for pipes as defined in claim 1, and the third power means comprising a double-acting power cylinder on the rotational assembly of the longitudinal body portion and being pivotally mounted therewith on the pivot axis of the cross support.

7. A manipulator for pipes as defined in claim 6, and a rotational shaft journaled in the cross support and carrying said cooperative pairs of jaws and having a gear thereon, and a cooperative gear driven by the double-acting power cylinder of the third power means.

8. A manipulator for pipes as defined in claim 7, and said cooperative gear comprising a rack bar coupled with the piston rod of the double-acting power cylinder of the third power means and being reciprocated thereby.

9. A manipulator for pipes as defined in claim 1, and a pair of coaxial trunnions on the cross support defining the pivot axis thereof with the longitudinal body portion, and the trunnions being pivotally engaged with said rotational assembly of the longitudinal body portion.

10. A manipulator for pipes as defined in claim 7, and the rotational assembly comprising a rotational shaft on the longitudinal body portion having a gear thereon, a cooperative driving gear engaged with the gear of said shaft, the cooperative gear being driven by said first power means, said rotational assembly further comprising a housing for the third power means fixed to said rotational shaft and turning therewith and including plate extensions pivotally engaged with said trunnions.

11. A manipulator for pipes as defined in claim 10, and the first power means comprising a double-acting power cylinder across the axis of the longitudinal body portion and said cooperative gear comprising a rack bar reciprocated by the piston rod of said power cylinder.

12. A manipulator for pipes as defined in claim 1, and the longitudinal body portion having a rear adapter flange adapted to be coupled with a mating flange of a support such as a crane mounted jib.

13. A manipulator for pipes as defined in claim 12, in which said crane mounted jib includes a pivot connection to the crane on which it is mounted, and luffing means connected to move said jib and the manipulator about said pivot connection in a vertical plane.

14. A manipulator for pipes and the lke as defined in claim 13, in which said jib includes a telescoping jib section carrying said mating flange.

15. A manipulator for pipes as defined in claim 1, and the second power means comprising a double-acting power cylinder near one side of the longitudinal body portion coupled between said rotational assembly of the longitudinal body portion and the pivoted cross support.

16. A manipulator for pipes as defined in claim 1, and the fourth power means comprising a pair of double-acting power cylinders on the cross support and having piston rods operatively connected with the movable jaws of said pairs, and support arms for the cylinder bodies of said power cylinders including first arms attached rigidly to hubs of the fixed jaws of said pairs and second arms secured to a rotational shaft of said third power means on said cross support.

17. A manipulator for positioning an object comprising a longitudinal body portion adapted for attachment to a support, a cross support pivotally mounted on the body portion and adapted to swing in two directions relative thereto, at least a pair of cooperative gripping jaws on the cross support and being bodily swingable therewith on the pivot axis of the cross support and also being rotationally connected to the cross support whereby the pair of jaws can move rotationally in unison around the axis of the cross support, one jaw of the cooperative pair being fixed relative to the other jaw of the pair and the other jaw of the pair being movable relative to the fixed jaw around the axis of the cross support, said longitudinal body portion including a rotational assembly bodily carrying the cross support and pivot means for the cross support defining said pivot axis, a first power means on said body portion operable to rotate said rotational assembly in two directions, a second power means connected between the body portion and cross support and operable to swing the latter in two directions on its pivot axis, a third power means connected between the body portion and said cross support and pair of jaws and operable to rotate the pair of jaws in unison in two directions around the axis of the cross support, and a fourth power means on the cross support and being operatively connected with the movable jaw of the cooperative pair to move the movable jaw in two directions relative to the other jaw of the pair around the axis of the cross support.

18. A manipulator as defined in claim 17, in which said third power means is operable to rotate the pair of jaws in the approximate range of 180°-195° in two directions around the axis of the cross support.

19. A manipulator as defined in claim 17, in which said second power means is operable to swing the cross support in the approximate range of 30°-45° in two directions on its pivot.

20. A manipulator as defined in claim 17, in which said first power means is operable to rotate said rotational assembly approximately 90° in two directions.

* * * * *